(12) United States Patent
Kluz et al.

(10) Patent No.: US 10,302,224 B2
(45) Date of Patent: May 28, 2019

(54) THREE-DIMENSIONAL MANUFACTURING OF QUIETING VALVE HAVING COMPLEX PASSAGES

(71) Applicant: Marotta Controls, Inc., Montville, NJ (US)

(72) Inventors: Krzysztof Kluz, Saddle Brook, NJ (US); Patrick Aristide Marotta, Summit, NJ (US)

(73) Assignee: Marotta Controls, Inc., Montville, NJ (US)

( * ) Notice: Subject to any disclaimer, the term of this patent is extended or adjusted under 35 U.S.C. 154(b) by 40 days.

(21) Appl. No.: 15/228,372

(22) Filed: Aug. 4, 2016

(65) Prior Publication Data

US 2017/0138507 A1 May 18, 2017

Related U.S. Application Data

(60) Provisional application No. 62/202,288, filed on Aug. 7, 2015.

(51) Int. Cl.
| | |
|---|---|
| *F16K 47/04* | (2006.01) |
| *F16K 47/08* | (2006.01) |
| *F16K 27/02* | (2006.01) |
| *F16K 47/14* | (2006.01) |
| *F15D 1/02* | (2006.01) |
| *F24F 13/08* | (2006.01) |
| *B23K 26/342* | (2014.01) |
| *B33Y 80/00* | (2015.01) |

(52) U.S. Cl.
CPC ............ *F16K 47/08* (2013.01); *B23K 26/342* (2015.10); *B33Y 80/00* (2014.12); *F15D 1/02* (2013.01); *F16K 27/0263* (2013.01); *F16K 47/04* (2013.01); *F16K 47/14* (2013.01); *F24F 2013/088* (2013.01); *Y10T 137/86734* (2015.04); *Y10T 137/86791* (2015.04); *Y10T 137/87877* (2015.04)

(58) Field of Classification Search
CPC .......... F16K 47/04; F16K 47/08; F16K 47/14; F16K 27/0263; B23K 26/342; Y10T 137/86734; Y10T 137/86791; Y10T 137/87877; F15D 1/02; F24F 2013/088
USPC ........................................................ 137/883
See application file for complete search history.

(56) References Cited

U.S. PATENT DOCUMENTS

| | | | |
|---|---|---|---|
| 4,921,014 A | 5/1990 | Tartaglia et al. | |
| 5,020,571 A | 6/1991 | Tartaglia et al. | |
| 5,769,122 A * | 6/1998 | Baumann ................ | F16K 47/08 137/625.3 |

(Continued)

*Primary Examiner* — Matthew W Jellett
*Assistant Examiner* — Christopher D Ballman
(74) *Attorney, Agent, or Firm* — Lerner, David, Littenberg, Krumholz & Mentlik LLP

(57) ABSTRACT

A noise-reducing valve structure includes a unitary spindle-shaped body having a central lumen for receiving a fluid flow and a poppet member, the body having an inner diameter adjacent the central lumen and an outer diameter and a circumferentially and axially distributed plurality of radial passages adapted to be opened and closed in accordance with a guided position of the poppet member, the plurality of radial passages extending through the spindle-shaped body from the inner diameter to the outer diameter and having a gradually increasing area from the inner diameter to the outer diameter.

9 Claims, 6 Drawing Sheets

(56) References Cited

U.S. PATENT DOCUMENTS

| | | | | |
|---|---|---|---|---|
| 6,095,196 | A * | 8/2000 | McCarty | F15D 1/02 |
| | | | | 137/625.3 |
| 6,161,584 | A * | 12/2000 | Hemme | F16K 47/08 |
| | | | | 137/625.3 |
| 6,244,297 | B1 * | 6/2001 | Baumann | F16K 47/08 |
| | | | | 137/625.3 |
| 6,615,874 | B2 * | 9/2003 | Thurston | F16K 47/08 |
| | | | | 137/625.3 |
| 6,718,633 | B1 * | 4/2004 | Glenn | F16K 47/08 |
| | | | | 137/625.3 |
| 7,069,950 | B1 * | 7/2006 | Bittner | F16K 47/08 |
| | | | | 137/625.37 |
| 9,528,632 | B2 * | 12/2016 | Glaun | F16K 47/04 |
| 9,677,687 | B2 * | 6/2017 | Yli-Koski | F16K 47/02 |
| 9,890,874 | B2 * | 2/2018 | Bergamini | F16K 11/07 |
| 2005/0199298 | A1 * | 9/2005 | Farrington | F16K 47/08 |
| | | | | 137/625.37 |
| 2014/0021383 | A1 * | 1/2014 | Yli-Koski | F16L 55/02718 |
| | | | | 251/118 |

\* cited by examiner

THREE-DIMENSIONAL MANUFACTURING OF QUIETING VALVE HAVING COMPLEX PASSAGES

CROSS-REFERENCE TO RELATED APPLICATIONS

The present application claims the benefit of the filing date of U.S. Provisional Patent Application No. 62/202,288 filed Aug. 7, 2015, the disclosure of which is hereby incorporated herein by reference.

BACKGROUND OF THE INVENTION

The present disclosure relates to "quiet-operating," or "noise-reducing" valve construction, as for use in conjunction with throttling elements of a reducing valve.

Exemplary valves are disclosed in U.S. Pat. Nos. 4,921,014 and 5,020,571, which are illustrative of one kind of valve formed of concentric rings, the disclosure of said patents being hereby incorporated by reference in their entirety as if set forth herein.

In one example, it may be said that a quieting valve suitable may comprise a radially stacked succession or nesting of concentric annuli, and a poppet member guided in the bore of the innermost annulus. The annuli provide successive stages of circumferentially and axially distributed radial passages, with manifolding connection of plural passages of each stage to the next-succeeding stage; and, to serve the purposes of progressive pressure reduction, the total collective sectional area increases, for the passages of each successive stage. In a pressure-reducing application, poppet position determines the volume of inlet or upstream flow to be served by some or by all of the passages of the inner annulus, and the successive stages serve progressive fractions of desired pressure reduction. Outlet or downstream flow from the valve is taken via a circumferential manifold around the outermost multiple-passage annulus.

Despite the achievements of valve constructions according to said patent, there is a need for even further noise reduction, and for cheaper and more efficient manufacturing techniques of quieting trim for control valves.

BRIEF DESCRIPTION OF THE DRAWINGS

Various embodiments of the present invention will now be discussed with reference to the appended drawings. It is appreciated that these drawings depict only some embodiments of the invention and are therefore not to be considered limiting of its scope.

SUMMARY OF THE DISCLOSURE

It is an object of the invention to provide an improved noise-reducing valve construction of the character indicated and particularly adapted for small-scale construction.

Another object is to provide a noise-reducing valve that is cheaper and easier to manufacture.

Another object is to provide a noise-reducing valve that includes a complex passage having a three-dimensional construction.

Another object is to provide a noise-reducing valve that reduces certain resonant frequency modes through a unitary construction.

In some examples, a method of manufacturing a noise-reducing valve structure includes generating a complex, three-dimensional passage structure that gradually branches out in two dimensions, producing a three-dimensional model of a noise-reducing valve having the complex, three-dimensional passage structure, slicing the model into a series of two-dimensional cross-sections and relaying the cross-sections to a direct metal sintering laser machine having a moving platform, a powdered metal dispenser and a laser, and successively (i) depositing powdered metal onto the moving platform, (ii) heating the powdered metal with a laser for each cross-section, and (iii) moving the platform downward by a distance sufficient to form the next cross-section until all cross-sections are made.

In some examples, a noise-reducing valve structure, includes a unitary spindle-shaped body having a central lumen for receiving a fluid flow from one end and a poppet member from another end, the body having an inner diameter adjacent the central lumen and an outer diameter, and a circumferentially and axially distributed plurality of radial passages adapted to be opened and closed in accordance with a guided position of the poppet member, the plurality of radial passages extending through the spindle-shaped body from the inner diameter to the outer diameter and having a gradual branching in two dimensions.

In some examples, a noise-reducing valve structure, comprising includes a unitary spindle-shaped body having a central lumen for receiving a fluid flow from one end and a poppet member from another end, the body having an inner diameter adjacent the central lumen and an outer diameter, and a circumferentially and axially distributed plurality of radial passages adapted to be opened and closed in accordance with a guided position of the poppet member, the plurality of radial passages extending through the unitary body from the inner diameter to the outer diameter and having a gradually increasing area from the inner diameter to the outer diameter.

DETAILED DESCRIPTION OF THE DRAWINGS

Figure 1:
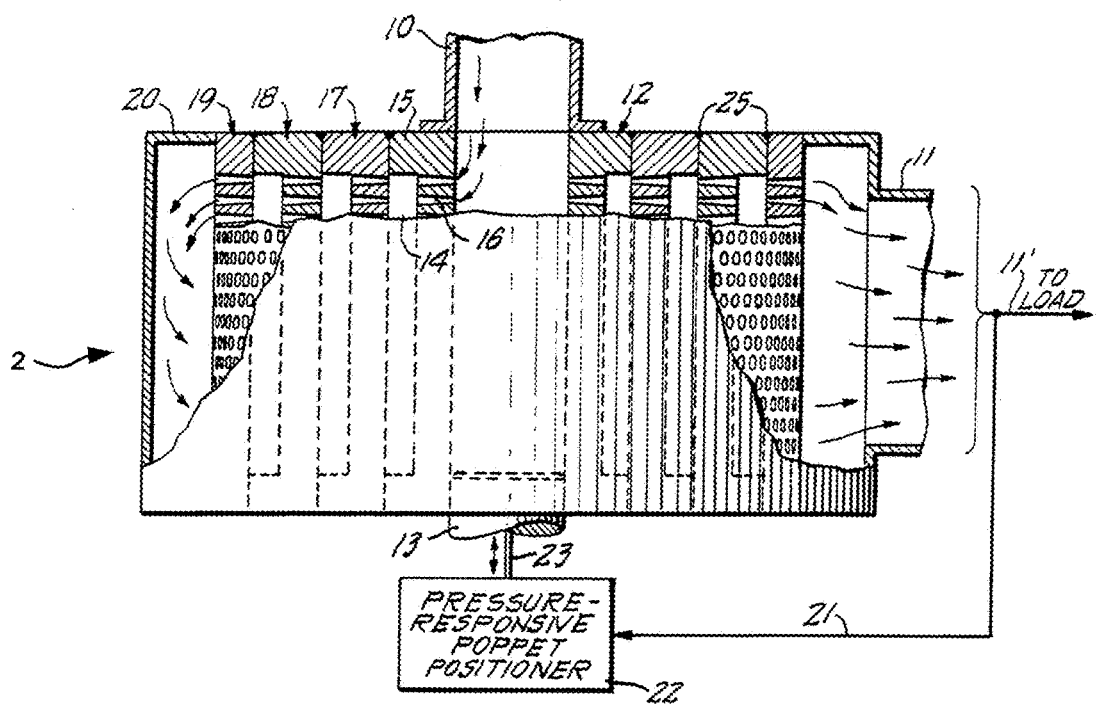
FIG. 1 is a simplified view in side elevation of a quieting valve, parts being broken-away and in section to reveal internal detail.

In FIG. 1, a reducing valve 2 includes an inlet-flow connection 10 and an outlet flow connection 11. Construction of the body of the valve relies upon an inner tubular member 12 open at one end to receive inlet flow, and providing guide support for a poppet valve member 13, from its other end and along its length. Tubular member 12 is characterized by a circumferentially continuous groove 14 between axial-end flanges 15, and between flanges 15 a circumferentially and axially distributed plurality of like passages 16 communicate between the bore of tubular member 12 and its circumferential groove 14. The position of poppet 13 determines how many of the passages 16 are, at any one time, to play a flow-regulating part in the operation of valve 2.

Surrounding and concentrically fitted to the shoulders 15 of inner tubular member 12 is a cascading succession of annuli 17, 18, 19, each of which is characterized by its own circumferentially and axially distributed plurality of passages; and individual passages of each of these annuli may be to the same size and shape specification as applies for each of the passages 16.

As in the case of inner tubular member 12, each of the successive annuli 17, 18 has its own circumferential groove between end shoulders, thereby providing axially and circumferentially extensive manifolded flow communication, from the discharge end of the passages of one annular stage to the inlet end of the passages of the next-succeeding annular stage. The outermost annulus 19 could also have been circumferentially grooved between end flanges, but in the form shown this was not necessary because a surrounding manifold member 20 is fitted to receive the discharge from the passages of annulus 19 and to communicate the same to the discharge port 11 of the valve.

To complete a description of valve 2 of FIG. 1, there is a schematic showing of a downstream line 11' from discharge port 11 to a load, suggested by legend. And a downstream-pressure connection 21 to line 11' serves pressure-responsive actuator means 22 having a direct displacing connection 23 to poppet member 13, thus governing the number of passages 16 in use at any one time and therefore regulating the flow in accordance with the number of passages used. For the extreme retraction position shown in FIG. 1 for poppet 13, an axially extensive spread of arrows denoting inlet-flow distribution is seen to account for outlet flow via an equally well distributed spread of arrows denoting outlet flow via the manifolding member 20. The more that the poppet is inwardly repositioned, the fewer the number of passages 16 that will be operative to determine flow through the valve, but since each stage (12, 17, 18) is axially and circumferentially manifolded to the next (17, 18, 19), the stages 17, 18, 19 serve to share the flow issuing from inner tubular member 12, regardless of poppet position.

Figure 2A:
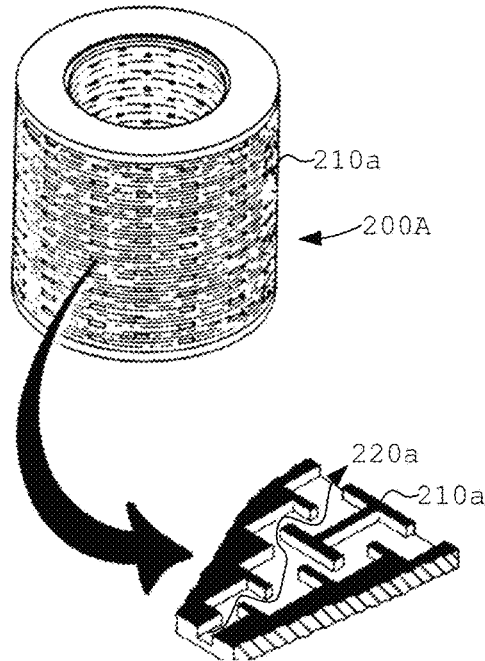
FIGS. 2A-B are perspective schematic view of disk-stacked quieting valves, parts being broken-away and in section to reveal internal detail.
Figure 2B:
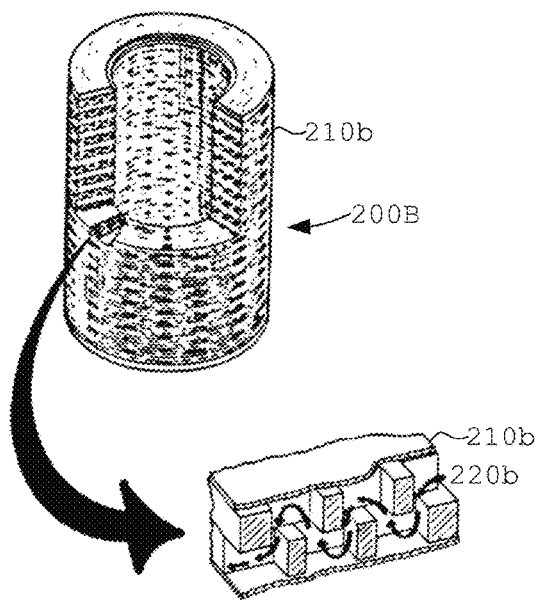

In another design, shown in FIGS. 2A and 2B, noise-reducing valve trims 200A,200B are formed of a plurality of disks 210a,210b that are stacked and welded together. As shown in these FIGS., each disk 210a,210b defines a passage 220a,220b including a series of sharp turns that result in pressure-loss when a fluid passes through the series of sharp turns from the interior of the valve quiet components 200A,200B to the exterior. Passages 220b may be etched, engraved, milled in one disk and disks may be stacked together. While component 200A may have a plurality of disks one on top of other, which are machined to the certain depth but not through, component 200B has different disks, which are machined through and stacked in a particular sequence to create "up-down" flow. Each flow path layer (two different disks) may be separated by a boundary in the form of separate solid discs.

While the designs of FIGS. 1, 2A and 2B reduce noise, they suffer from several drawbacks. First, manufacturing of such noise-reducing valves is expensive and complicated because each part needs to be independently manufactured and then assembled to form a valve quiet trim. For example, reducing valve of FIG. 1 requires the assembly of several rings that are then nested together and secured, and valves 200A,200B require a series of disk that are separately manufactured to have a passage and then assembled to form the valve. These manufacturing techniques may be expensive and inefficient. Second, valves having a greater number of components may be less than durable than desired. Third, valves formed in this manner may generate structure-borne vibration in the concentric rings or separate trim layers. Structure borne vibration has a negative effect on device durability and causes the airborne noise as well. It is believed that acceleration noise frequencies above 4000 Hz may be directly linked to structure-borne vibration.

Figure 3:
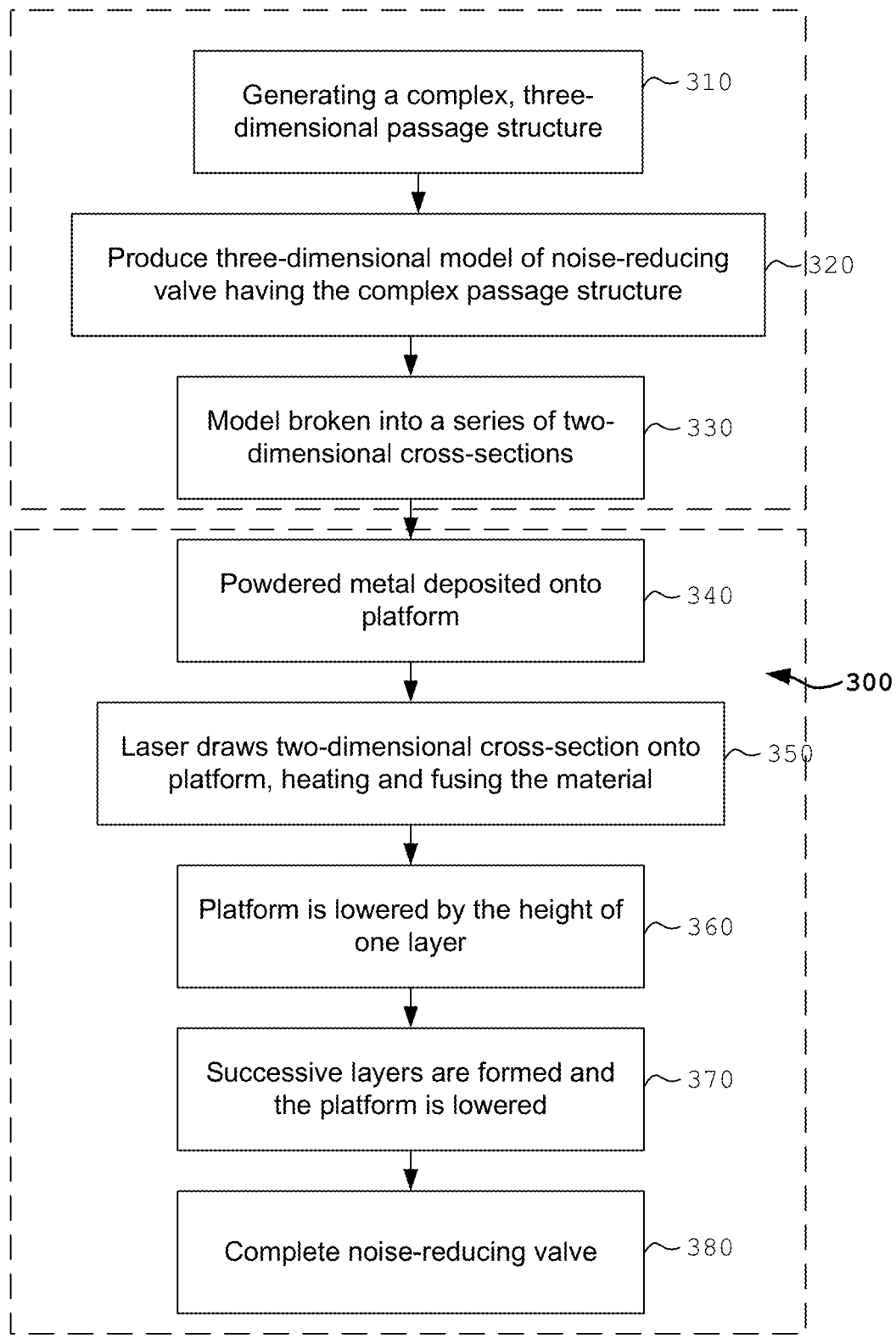
FIG. 3 is a flowchart of one method for forming a noise-reducing valve in accordance with the present disclosure.

FIG. 3 illustrates method 300 for manufacturing a noise-reducing valve through the use of direct metal laser sintering in accordance with one embodiment of the present disclosure. Direct metal laser sintering allows for manufacturing of parts with very high printing resolution, low distortion, and desirable machining properties, in addition to allowing uncomplicated post processing if required. Alternative additive manufacturing techniques may also be possible, depending on the design of the valve.

First, a complex, three-dimensional passage structure is generated in step 310. Traditional noise-reducing valves may include a series of substantially cylindrical or slightly frustoconical passages (e.g., passage 16 of FIG. 1) or sharp-edge type passages 220a,220b formed in a single disk 210a,210b. The present method allows for complex, three-dimensional passage structures that expand in two dimension that are not possible with concentric rings or stacked disks. Some of these structures are discussed in greater detail, below. In step 320, a three-dimensional model of a noise-reducing valve having the complex passage structure of step 310 is produced. Such a model may be in the form, for example, of a 3D CAD model. The model is sent to a direct metal laser sintering machine and the model is "sliced" into a series of two-dimensional cross-sections that form the layers to be built in step 330. These layers are downloaded to the direct metal laser sintering machine prior to the manufacturing steps.

During the build process, powdered metal is deposited onto a platform in step 340 through a material dispenser. In at least some examples, a material disposer may introduce a powdered metallic material, for example alloys such as 17-4 and 15-5 stainless steel, maraging steel, cobalt chromium, inconel 625 and 718, and titanium Ti6Al4V. Other alloy metals or materials may also be used. A laser draws a two-dimensional cross-section onto the platform, heating and fusing the material in step 350. In at least some examples, a high-powered 200 watt Yb-fiber optic laser is used to heat and fuse the powdered material. In step 360, the platform may then be lowered by a height of one layer or slice and successive layers are formed through additional powdered metal deposition and laser outlining (step 370). As will be appreciated, the process begins with the lower-most layer or cross-section and successively adds layers until the uppermost-layer is formed to complete the noise-reducing valve (step 380).

Thus, powdered metal is fused into a unitary part by melting it locally with a laser beam and a noise-reducing valve is built layer by layer in this additive technique. In at least some examples, each layer is approximately 20 microns in thickness. The resulting noise-reducing valve and may include the highly complex passage structures obtained from the 3D CAD file. Thus, through direct metal laser sintering, complex passage structures of noise-reducing valves are possible which could not be made using conventional techniques. Such complex passage structures may reduce aerodynamic noise and structural vibration in control valves, which is important both in industrial and military valve applications. Additionally, high airborne noise is a health hazard, while high vibration level impacts negatively the life of the equipment. By producing a noise-reducing valve from only a single piece, design is simplified, cost is reduced, and noise-reducing valve may be formed with superior noise and vibration reduction by reducing the number of parts and allowing intricate fluid flow path geometries to be manufactured within one solid part.

Figure 4A:
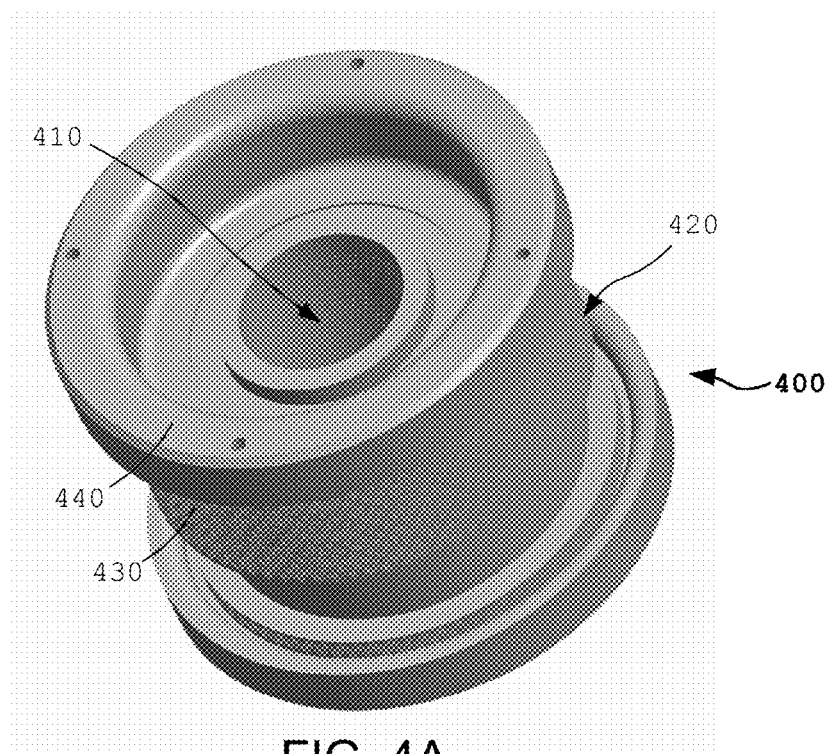
FIG. 4A is a perspective schematic view of a one-part quieting valve component according to one embodiment.
Figure 4B:
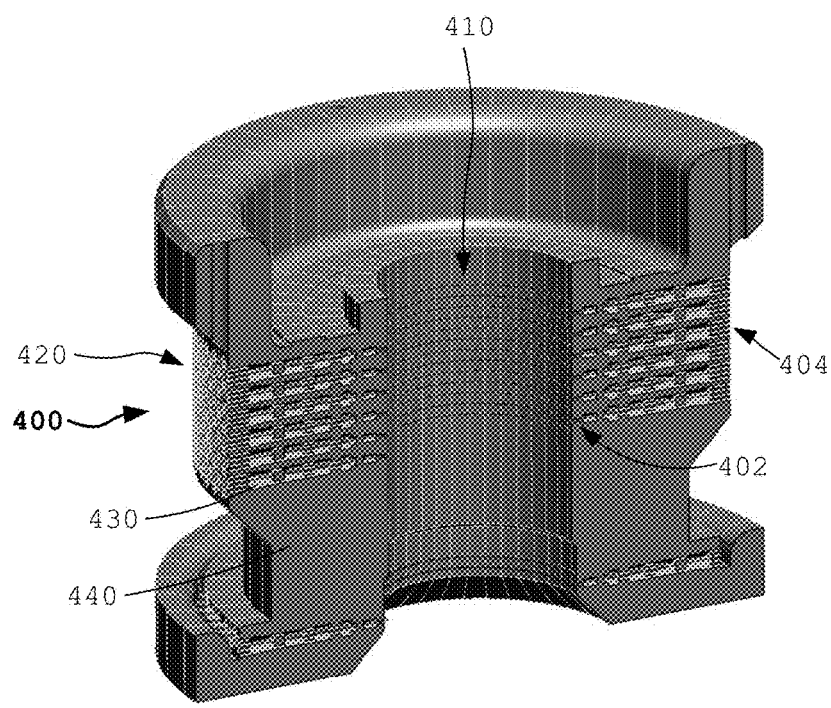
FIGS. 4B-4C are simplified schematic views of the quieting valve component of FIG. 4A, parts being broken-away and in section to reveal internal detail.
Figure 4C:
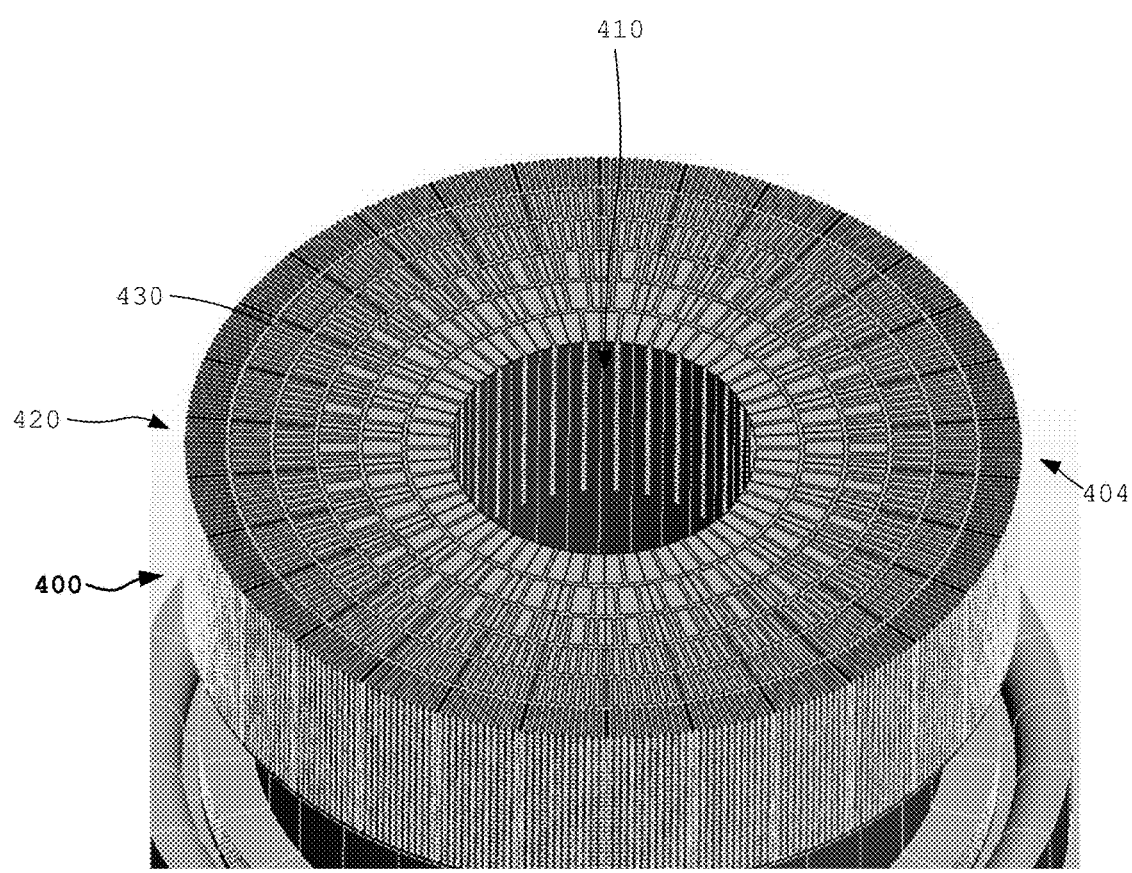

FIGS. 4A-C illustrate noise-reducing valve 400 manufactured using the methods described above. Noise-reducing valve 400 is generally spindle-shaped and includes an inflow 410 and an outflow 420. As shown in cross-section, a plurality of passages 430 extend from inner diameter 402 to outer diameter 404, the plurality of passages forming outlet 420. Passages 430 generally include an increasing area from inner diameter 402 to outer diameter 430. In the example shown, passage 430 is configured as a diamond-shaped structure that extends through body 440. Body 440 may be unitary (e.g., formed of a single piece) as shown and does not include any gaps or discontinuities therein except for passages 430. In other words, each passage structure 430 extends from inner diameter 402 to outer diameter 404 without traversing a discontinuity. In operation, gas or other fluids, enters through the hundreds of holes placed on the inner diameter 402 of body 440. The fluid then flows through passages 430, which are integrally formed in noise-reducing valve 400. As fluid flows through passages 430 it expands due to a sequential increase in flow area. Thus, the area of passages 430 increases while gas flows radially from the inner diameter 402 toward outer diameter 404, and noise is thereby reduced.

Figure 5:
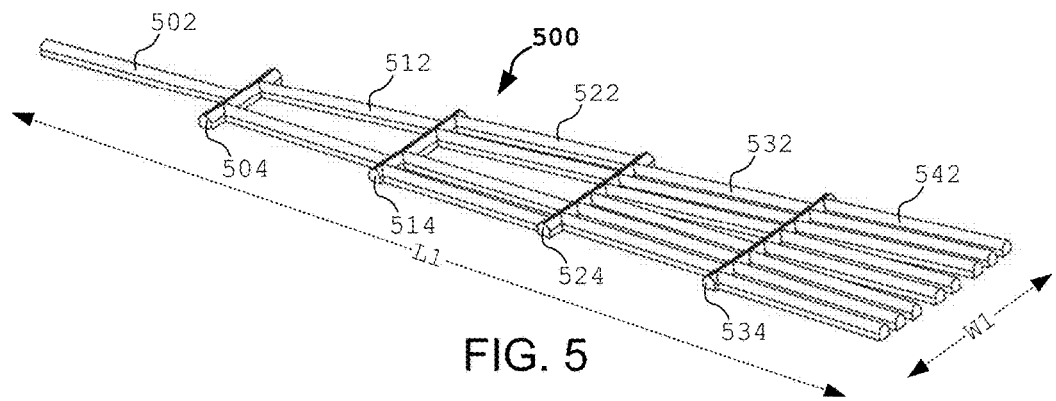
FIGS. 5-7 are variations of flow paths that are possible with the manufacturing techniques in accordance with one embodiment of the present disclosure.
Figure 6:
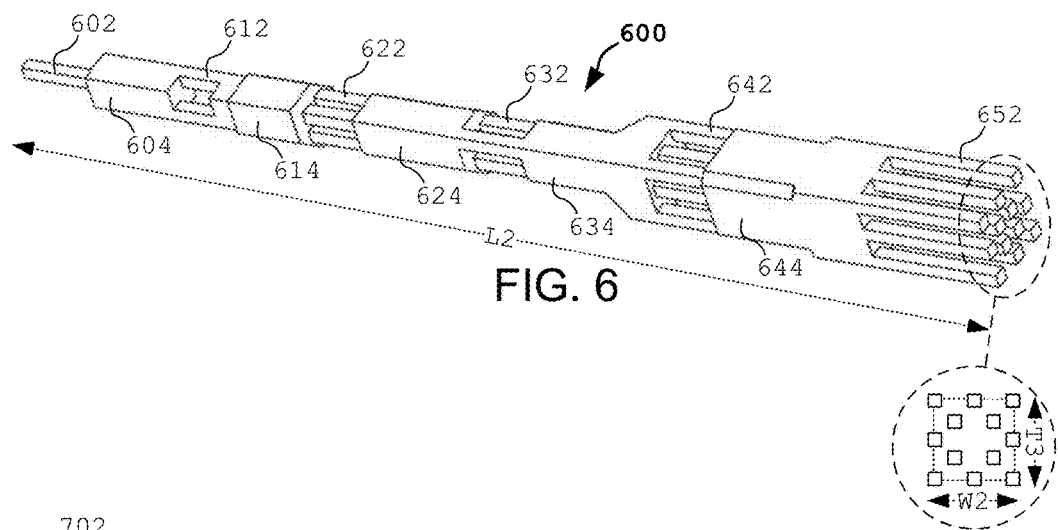
Figure 7:
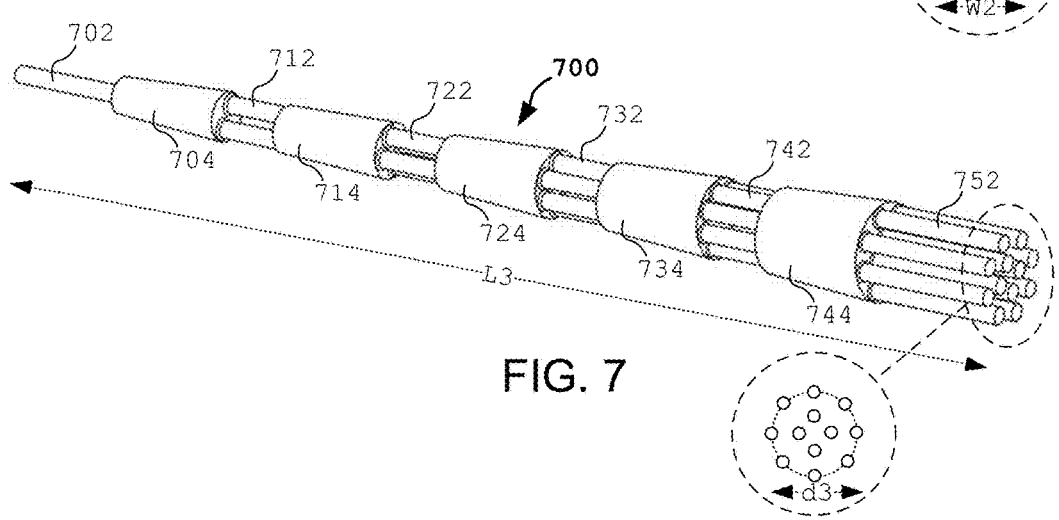

By way of example, FIGS. 5-7 illustrate various passage structures that may be formed using the disclosed methods. Passage structure 500 of FIG. 5 may be in the form of a horizontal dome, as shown, and may include an inlet channel 502 formed on the inner diameter of a noise-reducing valve and outlet channels 542 at the outer diameter of a noise-reducing valve. As shown, a single inlet channel 502 sequentially branches out until a fluid passes out of eight outlet channels 542 at the outer diameter of a noise-reducing valve. Specifically, inlet channel 502 joins to transverse connector 504 and is in communication therewith. Transverse connector 504 is in turn joined to and in communication with channels 512, which in turn are joined to connector 514. This branching continues from connector 514 to channels 522 to connector 524 to channels 532 to connector 534 and finally to outlet channels 542 so that the number of channels increase according to the following series from a single inlet channel to multiple outlet channels: 1, 2, 4, 6, 8. Passage structure 500 may have a length L1 and a width W1 at outlet channels 542. While substantially increasing the number of outlet channels may reduce noise, it may not be feasible with conventional manufacturing techniques. Additionally, because all of outlets channels 542 are arranged side-by-side, it may be difficult to add outlet channels due to space limitations. However, such configurations having a larger number of smaller channels are possible using method 300.

In another example, passage structure 600 of FIG. 6 may be diamond-shaped as shown and may include an inlet channel 602 formed on the inner diameter of a noise-reducing valve and outlet channels 652 at the outer diameter of a noise-reducing valve. As shown, a single inlet channel 602 sequentially branches out until a fluid passes out of twelve outlet channels 652 at the outer diameter of a noise-reducing valve. Specifically, inlet channel 602 joins to square connector 604 and is in communication therewith. Square connector 604 is in turn joined to and in communication with channels 612, which in turn are joined to another connector 614. It will be understood that though connectors 604 has a square cross-section, other connectors may have different shapes as needed, such as hexagonal cross-sections or other polygonal, circular or oval cross-sections. This branching continues from connector 614 to channels 622 to connector 624 to channels 632 to connector 634 to channels 642 to connector 644 and finally to outlet channels 652 so that the number of channels increases according to the following series from a single inlet channel to multiple outlet channels: 1, 2, 4, 6, 8, 12. Passage structure 600 may have a length L2, a width W2 and a thickness T2 at outlet channels 652 such that width W2 and thickness T2 are equal (i.e., outlet channels 652 are substantially arranged in a square having rows and columns of channels). By having a passage structure 600 that branches out in two dimensions (e.g., in both width and thickness) as shown, additional outlet channels may be added to further reduce noise. For example, instead of having only eight outlet channels as shown in FIG. 5, twelve outlet channels 652 are now formed near the outer diameter of a noise-reducing valve.

In another example, passage structure 700 of FIG. 7 may be in the shape of an expanding cone as shown and may include an inlet channel 702 formed on the inner diameter of a noise-reducing valve and outlet channels 752 at the outer diameter of a noise-reducing valve. As shown, a single inlet channel 702 sequentially branches out until a fluid passes out of twelve outlet channels 752 at the outer diameter of a noise-reducing valve. Channels 702 and 752 as well as the other channels disposed therebetween may all be of the same size. Specifically, inlet channel 702 joins to frusto-conical connector 704 and is in communication therewith. Frusto-conical connector 704 is in turn joined to and in communication with channels 712, which in turn are joined to another connector 714. This branching continues from connector 714 to channels 722 to connector 724 to channels 732 to connector 734 to channels 742 to connector 744 and finally to outlet channels 752 so that the number of channels increase according to the following series from a single inlet channel to multiple outlet channels: 1, 2, 4, 6, 8, 12. Passage structure 700 may have a length L3, a width and a thickness at outlet channels 752 such that outlet channels 752 are substantially arranged in a circle with diameter d3. By having a passage structure 700 that branches out in both width and thickness as shown, additional outlet channels may be added to further reduce noise.

Thus, by using additive methods such as direct metal laser sintering, complex flow geometries may be manufactured, which were impossible to manufacture through conventional methods. Additionally, it is possible to incorporate aerodynamic noise attenuating features in a single, compact part. This solid structure of the element may aid immensely in keeping flow induced vibration at a minimum.

Although the invention herein has been described with reference to particular embodiments, it is to be understood that these embodiments are merely illustrative of the principles and applications of the present invention. For example, the methods and valves disclosed herein may be used for liquid flow (e.g., water). In such cases, the techniques may reduce cavitation, a known source of vibration and airborne noise in liquid transfer. It is therefore to be understood that numerous modifications may be made to the illustrative embodiments and that other arrangements may be devised without departing from the spirit and scope of the present invention as defined by the appended claims.

It will be appreciated that the various dependent claims and the features set forth therein can be combined in different ways than presented in the initial claims. It will also be appreciated that the features described in connection with individual embodiments may be shared with others of the described embodiments.

The invention claimed is:

1. A noise-reducing valve structure, comprising:

a unitary, one-piece, spindle-shaped body having a central lumen for receiving a fluid flow from one end and a poppet member from another end, the body having an inner diameter adjacent the central lumen and an outer diameter; and a circumferentially and axially distributed plurality of radial passages adapted to be opened and closed in accordance with a guided position of the poppet member, each of the plurality of radial passages extending from a single inlet channel through the spindle-shaped body from the inner diameter to a plurality of transverse connectors and an increasing plurality of exit ports connected to each of said plurality of transverse connectors whereby each of such plurality of exit ports increases in number downstream of each of said plurality of transverse connectors to a final plurality of exit ports at said outer diameter.

2. The noise-reducing valve structure of claim 1, wherein each of the connectors has a square cross-section.

3. The noise-reducing valve structure of claim 1, wherein each of the connectors is frusto-conical.

4. The noise-reducing valve structure of claim 1, wherein each of said final plurality of exit ports at said outer diameter being arranged in rows and columns.

5. The noise-reducing valve structure of claim 1, wherein each of said final plurality of exit ports at said outer diameter being arranged in a circle.

6. A method of manufacturing a noise-reducing valve structure comprising:

generating a complex, three-dimensional passage structure including a plurality of radial passages extending from a single inlet channel to a plurality of transverse connectors and an increasing plurality of exit ports connected to each of said plurality of transverse connectors, whereby each of said plurality of exit ports increases in number downstream of each of said plurality of transverse connectors, including a final plurality of exit ports;

producing a three-dimensional model of a noise-reducing valve having the complex, three-dimensional passage structure;

slicing the model into a series of two-dimensional cross-sections and relaying the cross-sections to a direct metal sintering laser machine having a moving platform, a powdered metal dispenser and a laser; and successively (i) depositing powdered metal onto the moving platform, (ii) heating the powdered metal with a laser for each cross-section, and (iii) moving the platform downward by a distance sufficient to form the next cross-section until all cross-sections are made.

7. The method of claim 6, wherein each cross-section is 20 microns in thickness.

8. The method of claim 6, wherein the complex, three-dimensional passage structure includes a final plurality of exit ports arranged in rows and columns.

9. The method of claim 6, wherein the complex, three-dimensional passage structure includes final plurality of exit ports arranged in a circle.

* * * * *